US005091648A

United States Patent [19]

Owers et al.

[11] Patent Number: 5,091,648

[45] Date of Patent: Feb. 25, 1992

[54] RADIATION DETECTION ARRANGEMENTS AND METHODS

[75] Inventors: Ian A. Owers, Fife; John L. Galloway, Edinburgh, both of Scotland

[73] Assignee: Racal-Guardall (Scotland) Limited, Edinburgh, Scotland

[21] Appl. No.: 454,695

[22] Filed: Dec. 21, 1989

[30] Foreign Application Priority Data

Dec. 22, 1988 [GB] United Kingdom ................. 8829892

[51] Int. Cl.[5] ......................... G01J 5/04; G08B 13/19

[52] U.S. Cl. .................................... 250/342; 250/349; 340/567

[58] Field of Search ........................ 250/349, 339, 342; 340/567

[56] References Cited

U.S. PATENT DOCUMENTS

| | | | |
|---|---|---|---|
| 4,465,998 | 8/1984 | Durand | 340/557 |
| 4,709,153 | 11/1987 | Schofield | 250/353 |

FOREIGN PATENT DOCUMENTS

| | | | |
|---|---|---|---|
| 0400158 | 7/1969 | Australia | 250/349 |
| 005352 | 11/1979 | European Pat. Off. | |
| 0078443 | 5/1983 | European Pat. Off. | |
| 0186226 | 7/1986 | European Pat. Off. | 340/567 |
| 0289621 | 10/1987 | European Pat. Off. | |
| 8609515.3 | 8/1986 | Fed. Rep. of Germany | |
| 1353615 | 8/1971 | United Kingdom | |
| 2141228 | 6/1983 | United Kingdom | |
| 2175686 | 5/1985 | United Kingdom | |
| 2175689 | 5/1985 | United Kingdom | |

*Primary Examiner*—Carolyn E. Fields
*Assistant Examiner*—James Beyer
*Attorney, Agent, or Firm*—Leydig, Voit & Mayer

[57] ABSTRACT

An intruder detection system employs two infra-red sensors 5,60 within the same housing 4. Both sensors have substantially the same field of view 6 and one 5 of the sensors detects an intruder by sensing the latter's emitted IR. The other sensor 60 detects near-IR. In order to detect against the presence of IR masking material in the field of view (which might be used to mask the presence of an intruder) remote units are provided, each emitting near-IR to sensor 60. The output from the remote units may be coded to distinguish them from the ambient IR. A warning is produced if a mask (such as mask 40) blocks one of the remote units.

6 Claims, 1 Drawing Sheet

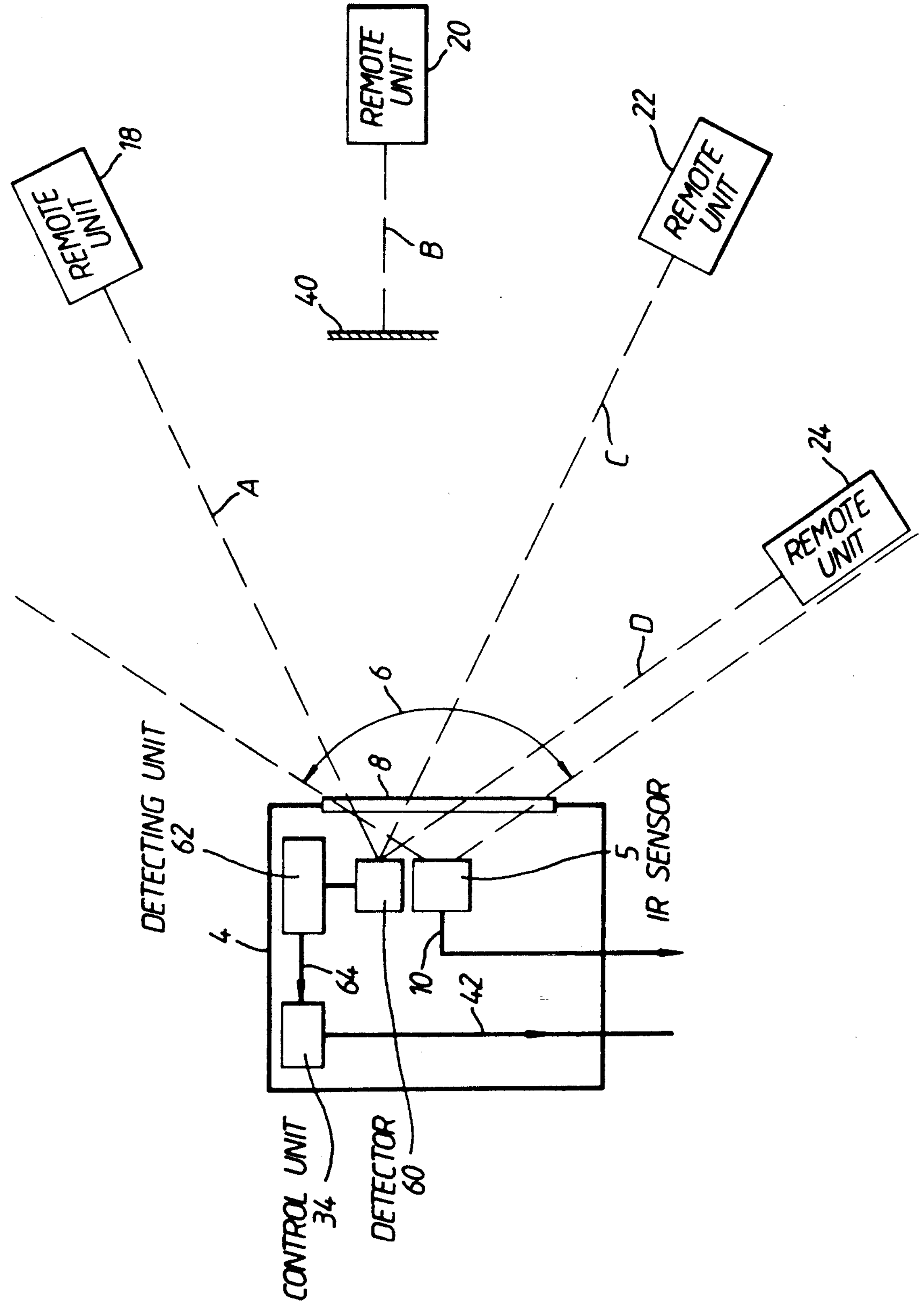
REMOTE UNIT
18
REMOTE UNIT
20
REMOTE UNIT
22
REMOTE UNIT
24
A
B
C
D
40
6
8
DETECTING UNIT
62
5
IR SENSOR
4
64
10
42
CONTROL UNIT
34
DETECTOR
60

RADIATION DETECTION ARRANGEMENTS AND METHODS

BACKGROUND OF THE INVENTION

1. Field of the Invention

The invention relates to radiation detecting arrangements and methods. More specifically, though not essentially, the invention relates to intruder detecting arrangements and methods using passive infra-red (IR) sensors.

2. Prior Art

Intruder detection arrangements employing passive infra-red sensors detect intruders by means of an infra-red radiation sensor having a field of view directed into the area to be protected. If an intruder appears in this field of view, the infra-red radiation which they emit as compared with the immediate surroundings, will be detected by the sensor and an alarm signal will be produced. However, such a system will be rendered ineffective if an object or material which is opaque to IR radiation is accidentally or intentionally placed in the view of the sensor.

A known arrangement for dealing with this problem employs a source of IR radiation associated with the IR sensor. This source directs radiation into the field of view with the intention that it be reflected by any masking material present, the so-reflected radiation being detected by the sensor so as to indicate the presence of the masking material. However, such an arrangement will only detect masking material close to the sensor and only if the masking material is reflective to IR radiation.

Another known arrangement employs a source of IR radiation adjacent to the sensor but outside the window through which the sensor views its field of view, this source directing radiation through the window onto the sensor. Such an arrangement can detect a mask placed directly over the window but cannot detect a mask placed further out into the field of view.

A further known arrangement employs a source of radiation adjacent to the sensor which directs its radiation to a reflector fixed to a wall or other suitable means opposite the sensor. The reflector reflects this radiation back to a special detector, also adjacent to the main sensor. If this special detector receives no radiation from the source, this is indicative of the presence of a mask. However, such an arrangement is limited in that it can only detect masks within the paths from the source to the reflector and from the reflector to the special detector.

SUMMARY OF THE INVENTION

According to the invention, there is provided an intruder detection system for detecting predetermined radiation within a predetermined area, comprising radiation sensing means sensitive to the predetermined radiation and having a field of view encompassing said area, and at least one test source of test radiation for directing the test radiation towards the radiation sensing means for detection by the sensing means, characterised in that the radiation sensing means comprises first and second radiation sensing means positioned within the same housing and having substantially identical fields of view emcompassing the area to be protected, the first sensing means being capable of detecting first predetermined radiation, but not the second predetermined radiation, and the second sensing means being capable of detecting the second predetermined radiation, but not the first predetermined radiation, said at least one test source of the second predetermined radiation, is positioned within the area and directs its radiation to the second sensing means, that there is provided means responsive to the output of the first sensing means for producing a warning output indicative of the presence of an intruder within the area and means responsive to the second sensing means in order to detect the presence of material within the area which attenuates the second predetermined radiation.

According to a further aspect of the invention, there is further provided a method of detecting intruders, comprising the steps of sensing, from a predetermined location, for the presence of radiation emitted by an intruder within a predetermined area and sensing for test radiation, characterised in that the test radiation and said radiation emitted by the intruder are different, the test radiation is emitted within or adjacent to the said area and is directed along at least one predetermined path to the predetermined location for detection thereat, and it is determined whether the emitted test radiation is received at the predetermined location along the said path whereby to determine whether the path is interrupted.

BRIEF DESCRIPTION OF THE DRAWINGS

An intruder detection arrangement embodying the invention, and intruder detection methods according to the invention, will now be described, by way of example only, with reference to the accompanying diagrammatic drawing which shows a block diagram of the arrangement.

DETAILED DESCRIPTION

As shown in the drawing, a main unit 4 houses an IR radiation sensor 5 which views a field of view 6 through an IR-transmissive window 8. If an intruder moves into the field of view 6, the IR emitted by the intruder is detected by the sensor 5, this IR resulting from the inevitable difference in temperature between the intruder and the immediate surroundings. When the sensor detects IR, as a result of the presence of an intruder, or other unexpected or unauthorised IR source, it produces an alarm output on line 10 connected directly to an alarm (not shown).

In addition, the arrangement employs several remote units such as shown at 18, 20, 22 and 24. Each of the remote units includes a source which does not emit IR, but emits radiation at a shorter, near-IR, wavelength (for example, in the range 0.8 $\mu$m to 1.0 $\mu$m). This near-IR cannot be detected by sensor 5 and a suitable near IR detector 60 is therefore provided within the unit 4 and immediately adjacent sensor 5. This detector 60 receives the near-IR from the remote units 18, 20, 22 and 24.

The use of near-IR for the remote units 18, 20, 22 and 24 has the advantage that low powered radiation sources can be used within each of them, and these radiation sources can be activated intermittently whereby to further reduce power consumption.

Each of the remote units can be activated, in a manner to be described, so as to emit near-IR and to direct this near IR to the detector 60 along paths indicated by the dashed lines A, B, C and D. The remote units are positioned around the field of view of detector 60, and preferably adjacent the far boundary of the area to be protected.

The electrical output from detector 60 is monitored by a detecting unit 62 which determines whether this output corresponds to the receipt by the detector 60 of uninterrupted near-IR from all of the remote units. If the detecting unit detects that near-IR from one of the remote units is not reaching detector 60, it produces a warning output on a line 64 which indicates the presence of a mask in one of the paths A, B, C or D. For example, the detecting unit 62 could operate by assessing the magnitude of the output from sensor 60. If near-IR from all the remote units 18, 20, 22, 24 is reaching detector 60, the electrical output from the detector 60 will be at least at a predetermined level. However, if detecting unit 62 detects that the output is less than this predetermined level, this is indicative of the presence of a mask, such as shown at 40, in one of the paths A, B, C or D, and a warning output on line 64 is therefore produced.

In an alternative arrangement, a control unit 34, connected to the output of detecting unit 62, could be used to recognise near-IR produced by each remote unit. To that end, each of the remote units 18, 20, 22 and 24 could be arranged to produce its near-IR in a differently coded fashion so that the resultant output from detector 60 would be coded according to a combination of the coded outputs received. In this way, the control unit 34 would be arranged to expect an individually coded signal from each remote unit at predetermined intervals and would be able to assess if the near-IR from one of the remote units is not being received. If the near-IR from one of the remote units was not being received, control unit 34 would produce a warning output on line 42. This warning output may identify the particular remote unit 18, 20, 22 and 24 whose radiation path is being blocked by a mask and thus indicate the approximate position of the mask.

It will be understood that the remote units, being emissive of near IR, may be self-contained and battery powered and so they need not be controlled by the control unit 34.

Alternatively, however, the control unit 34 is arranged to repeatedly and successively activate the remote units 18, 20, 22 and 24 so that each, in turn, emits near-IR towards detector 60. Assuming that this emitted near-IR is received by the detector 60, the detector will produce an output which is fed to the control unit 34. The control unit, therefore, detects that in response to the activation of each remote unit 18, 20, 22 and 24, resultant near-IR is detected by detector 60. Provided that no obstruction is present in paths A, B, C and D, each remote unit's near IR will be detected by the detector 60. However, if masking material, such as shown at 40, is present within the path from one of the remote units 18, 20, 22 and 24, to the detector 60, that remote unit's near-IR will not be detected by the detector 60. The control unit 34 would then respond by producing a warning output to indicate the presence of a mask within the field of view of the detector.

It will be appreciated that it is a simple matter to arrange for the warning output to identify the particular remote unit 18, 20, 22 and 24 whose radiation path is blocked by the mask and thus to indicate the approximate position of the mask. For example, the remote units may be connected together in such a manner that each unit is caused to emit near-IR in response to, and at a preset time after, production of a trigger signal by control unit 34. Thus, the emission of near-IR from each remote unit is subject to a respective delay relative to the timing of the trigger signal. The control unit 34 could incorporate suitable timing circuitry arranged to monitor the relative timings of electrical signals output on line 10 from sensor 60 whereby to identify the source of radiation received from units 18, 20, 22 and 24.

Alternatively, the remote units 18, 20, 22, and 24 may be connected to the control unit 34 via a serial data path, and each remote unit is addressed individually by a respective coded address from the control unit, each unit being arranged to decode its respective address and emit near-IR in response thereto.

It will be appreciated that the described intruder detection arrangements enable the entire field of view to be protected against accidental or intentional presence masks, it merely being necessary to provide a sufficient number of appropriately positioned remote units.

We claim:

1. An intruder detection system for detecting predetermined radiation within a predetermined area, comprising radiation sensing means sensitive to the predetermined radiation and having a field of view encompassing said area, and a plurality of test sources of test radiation positioned at different locations within said area, for directing the test radiation towards the radiation sensing means for detection by the sensing means, the test radiation produced by each test source being distinguishable from the test radiation produced by others of the test sources, wherein the radiation sensing means comprises first and second radiation sensing means positioned within the same housing and having substantially identical fields of view encompassing the area to be protected, the first sensing means being capable of detecting first predetermined radiation, but not second predetermined radiation, and the second sensing means being capable of detecting the second predetermined radiation, but not the first predetermined radiation, said test sources of the second predetermined radiation are positioned within the area and direct their radiation to the second sensing means, and there is provided means responsive to the output of the first sensing means for producing a warning output indicative of the presence of an intruder within the area and means responsive to the output of the second sensing means in order to detect the presence of material within the area which attenuates the second predetermined radiation and for determining whether or not that output corresponds to receipt by the second sensing means of the second predetermined radiation from all or less than all of the test sources whereby to detect the presence of material within the area which attenuates the second predetermined radiation.

2. An intruder detection system for detecting predetermined radiation within a predetermined area, comprising radiation sensing means sensitive to the predetermined radiation and having a field of view encompassing said area, a plurality of test sources of test radiation positioned at different locations within said area, for directing the test radiation towards the radiation sensing means for detection by the sensing means, the test radiation produced by each test source being distinguishable from the test radiation produced by others of the test sources, wherein the radiation sensing means comprises first and second radiation sensing means positioned within the same housing and having substantially identical fields of view encompassing the area to be protected, the first sensing means being capable of detecting first predetermined radiation, but not second predetermined radiation, and the second sensing means being capable of detecting the second predetermined radiation, but not the first predetermined radiation, said test sources of the second predetermined radiation, are positioned within the area and direct their radiation to the second sensing means, and there is provided means responsive to the output of the first sensing means for producing a warning output indicative of the presence of an intruder within the area and means responsive to the output of the second sensing means in order to detect the presence of material within the area which attenuates the second predetermined radiation and for determining whether or not that output corresponds to receipt by the second sensing means of the second predetermined radiation from all or less than all of the test sources whereby to detect the presence of material within the area which attenuates the second predetermined radiation, and including means for activating said plurality of test sources whereby each test source is activated at a different respective time following production of an activation signal by the activation means, and means for monitoring the reception time of test radiation detected by the second sensing means whereby to identify the test source emitting the detected radiation.

3. An intruder detection system for detecting predetermined radiation within a predetermined area, comprising radiation sensing means sensitive to the predetermined radiation and having a field of view encompassing said are, and a plurality of battery-operated test sources of test radiation for directing the test radiation towards the radiation sensing means for detection by the sensing means, wherein the radiation sensing means comprises first and second radiation sensing means positioned within the same housing and having substantially identical fields of view encompassing the area to be protected, the first sensing means being capable of detecting first predetermined radiation, but not second predetermined radiation, and the second sensing means being capable of detecting the second predetermined radiation, but not the first predetermined radiation, said test sources of the second predetermined radiation, are positioned within the area and direct their radiation to the second sensing means, and there is provided means responsive to the output of the first sensing means for producing a warning output indicative of the presence of an intruder within the area and means responsive to the second sensing means in order to detect the presence of material within the area which attenuates the second predetermined radiation, and including means for activating said plurality of test sources whereby each test source is activated at a different respective time following production of an activation signal by the activation means, and means for monitoring the reception time of test radiation detected by the second sensing means whereby to identify the test source emitting the detected radiation.

4. An intruder detection system for detecting predetermined radiation within a predetermined area, comprising radiation sensing means sensitive to the predetermined radiation and having a field of view encompassing said area, and a plurality of test sources of test radiation positioned at different locations within said area, for directing the test radiation towards the radiation sensing means for detection by the sensing means, the test radiation produced by each test source being distinguishable from the test radiation produced by others of the test sources, wherein the radiation sensing means comprises first and second radiation sensing means positioned within the same housing and having substantially identical fields of view encompassing the area to be protected, the first sensing means being capable of detecting first predetermined radiation, but not second predetermined radiation, and the second sensing means being capable of detecting the second predetermined radiation, but not the first predetermined radiation, said test sources of the second predetermined radiation, are positioned within the area and direct their radiation to the second sensing means, and there is provided means responsive to the output of the first sensing means for producing a warning output indicative of the presence of an intruder within the area and means responsive to the output of the second sensing means in order to detect the presence of material within the area which attenuates the second predetermined radiation and for determining whether or not that output corresponds to receipt by the second sensing means of the second predetermined radiation from all or less than all of the test sources whereby to detect the presence of material within the area which attenuates the second predetermined radiation and wherein the test radiation produced by each test source is coded differently from the test radiation produced by others of the test sources, and the second sensing means is responsive to the coding of the test radiation whereby to identify the test source producing the coded test radiation.

5. An intruder detection system for detecting predetermined radiation within a predetermined area, comprising radiation sensing means sensitive to the predetermined radiation and having a field of view encompassing said area, and a plurality of battery-operated test sources of test radiation for directing the test radiation towards the radiation sensing means for detection by the sensing means, wherein the radiation sensing means comprises first and second radiation sensing means positioned within the same housing and having substantially identical fields of view encompassing the area to be protected, the first sensing means being capable of detecting first predetermined radiation, but not second predetermined radiation, and the second sensing means being capable of detecting the second predetermined radiation, but not the first predetermined radiation, said test sources of the second predetermined radiation, are positioned within the area and direct their radiation to the second sensing means, and there is provided means responsive to the output of the first sensing means for producing a warning output indicative of the presence of an intruder within the area and means responsive to the second sensing means in order to detect the presence of material within the area which attenuates the second predetermined radiation, and wherein the test radiation produced by each test source is coded differently from the test radiation produced by others of the test sources, and the second sensing means is responsive to the coding of the test radiation whereby to identify the test source producing the coded test radiation.

6. An intruder detection system as claimed in claim 5, wherein the test radiation is produced by the test sources at predetermined time intervals.

* * * * *